US011250471B1

(12) United States Patent
Agostino et al.

(10) Patent No.: US 11,250,471 B1
(45) Date of Patent: *Feb. 15, 2022

(54) METHOD AND APPARATUS FOR CREATING WEB CONTENT AND IDENTIFYING ADVERTISEMENTS FOR USERS CREATING AND VIEWING CONTENT

(71) Applicant: Groupon, Inc., Chicago, IL (US)

(72) Inventors: Val Agostino, Palo Alto, CA (US); Axel Albin-Lax, Palo Alto, CA (US); Sinclair Hamilton Hitchings, Palo Alto, CA (US); Travis Neilson, Redwood City, CA (US)

(73) Assignee: Groupon, Inc., Chicago, IL (US)

( * ) Notice: Subject to any disclaimer, the term of this patent is extended or adjusted under 35 U.S.C. 154(b) by 326 days.

This patent is subject to a terminal disclaimer.

(21) Appl. No.: 16/392,038

(22) Filed: Apr. 23, 2019

Related U.S. Application Data

(63) Continuation of application No. 13/928,011, filed on Jun. 26, 2013, now Pat. No. 10,417,667.

(60) Provisional application No. 61/665,213, filed on Jun. 27, 2012.

(51) Int. Cl.
*G06Q 30/02* (2012.01)
(52) U.S. Cl.
CPC ................ *G06Q 30/0269* (2013.01)
(58) Field of Classification Search
CPC .................................................. G06Q 30/0269
See application file for complete search history.

(56) References Cited

U.S. PATENT DOCUMENTS

| | | | |
|---|---|---|---|
| 2003/0014311 A1* | 1/2003 | Chua .................. | G06Q 30/0218 705/14.35 |
| 2008/0071929 A1* | 3/2008 | Motte ..................... | H04L 67/02 709/246 |
| 2008/0201225 A1* | 8/2008 | Maharajh .............. | H04M 15/41 705/14.43 |
| 2009/0157512 A1* | 6/2009 | King .................... | H04L 12/1859 705/14.27 |
| 2009/0327251 A1* | 12/2009 | Walmer ................. | G06Q 30/02 |
| 2011/0082824 A1* | 4/2011 | Allison .................. | G06N 20/00 706/20 |
| 2011/0138306 A1* | 6/2011 | Soohoo ................. | G06Q 30/00 715/760 |
| 2011/0145068 A1* | 6/2011 | King ..................... | G06F 40/169 705/14.55 |
| 2011/0153423 A1* | 6/2011 | Elvekrog ............... | G06Q 30/02 705/14.53 |
| 2011/0161181 A1* | 6/2011 | Esteve Asensio ..... | G06Q 30/02 705/14.73 |

(Continued)

OTHER PUBLICATIONS

Wiley Encyclopedia of Computer Science Engineering (Year: 2009).
U.S. Appl. No. 13/928,011, filed Jun. 26, 2013, Pending.

*Primary Examiner* — Breffni Baggot
(74) *Attorney, Agent, or Firm* — Alston & Bird LLP

(57) ABSTRACT

A system and method allows a user to define books of pictures and customizable text, and HTML code is generated from such definition to allow the books to be displayed on a browser. Based on the user's book definitions or viewers activities, the individual's interests, moods and/or emotions may be identified and ads may be identified and displayed to such person that correspond to such interests, moods or emotions.

20 Claims, 6 Drawing Sheets

(56) References Cited

U.S. PATENT DOCUMENTS

| | | | |
|---|---|---|---|
| 2013/0030987 A1* | 1/2013 | Zuckerberg | G06Q 50/01 705/39 |
| 2014/0096038 A1* | 4/2014 | Schultz | G06F 3/04845 715/753 |
| 2014/0193047 A1* | 7/2014 | Grosz | G06Q 10/10 382/118 |

* cited by examiner

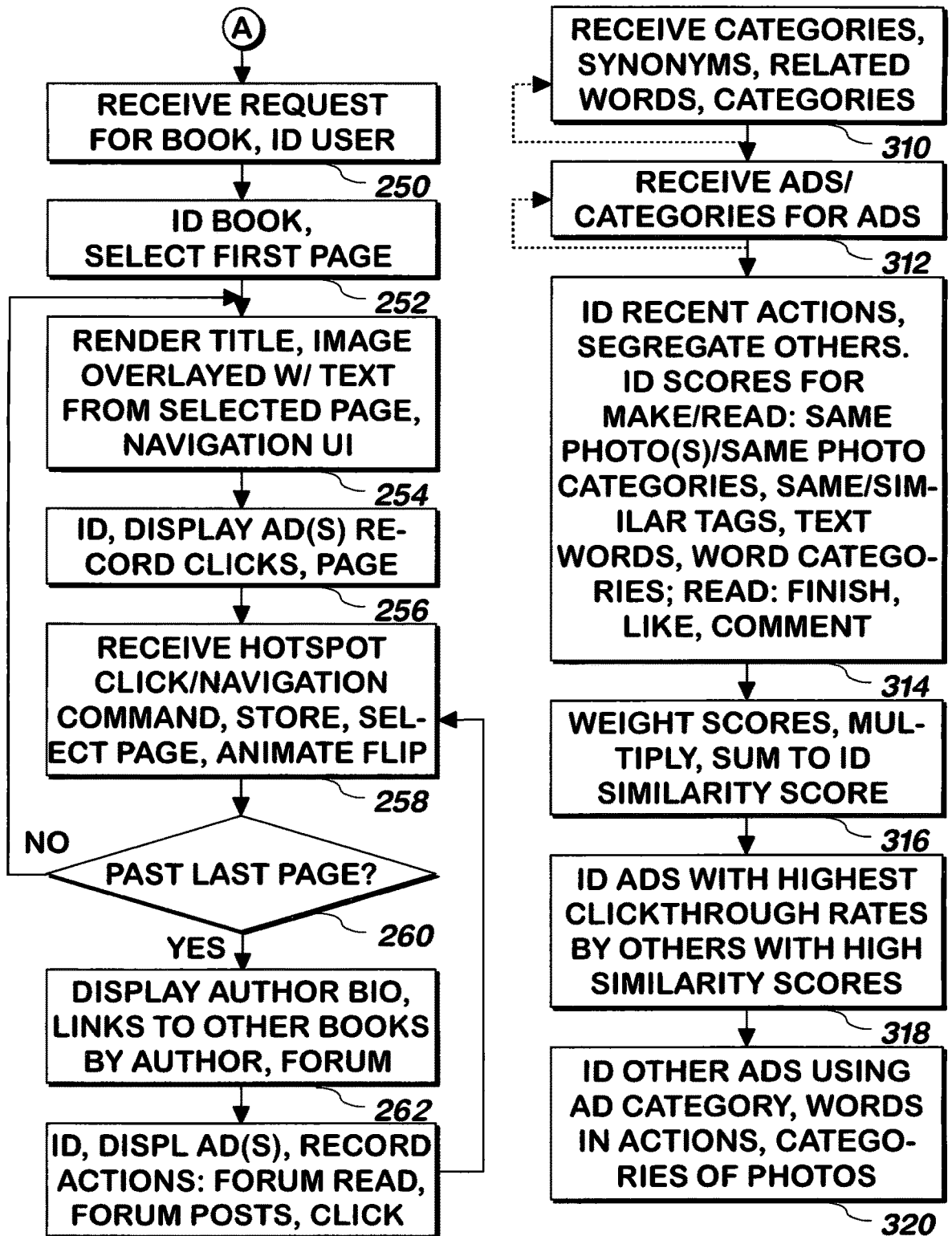

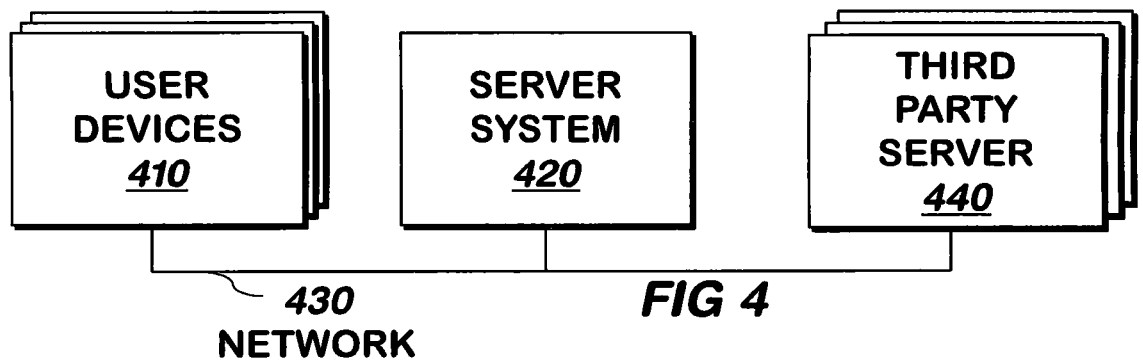
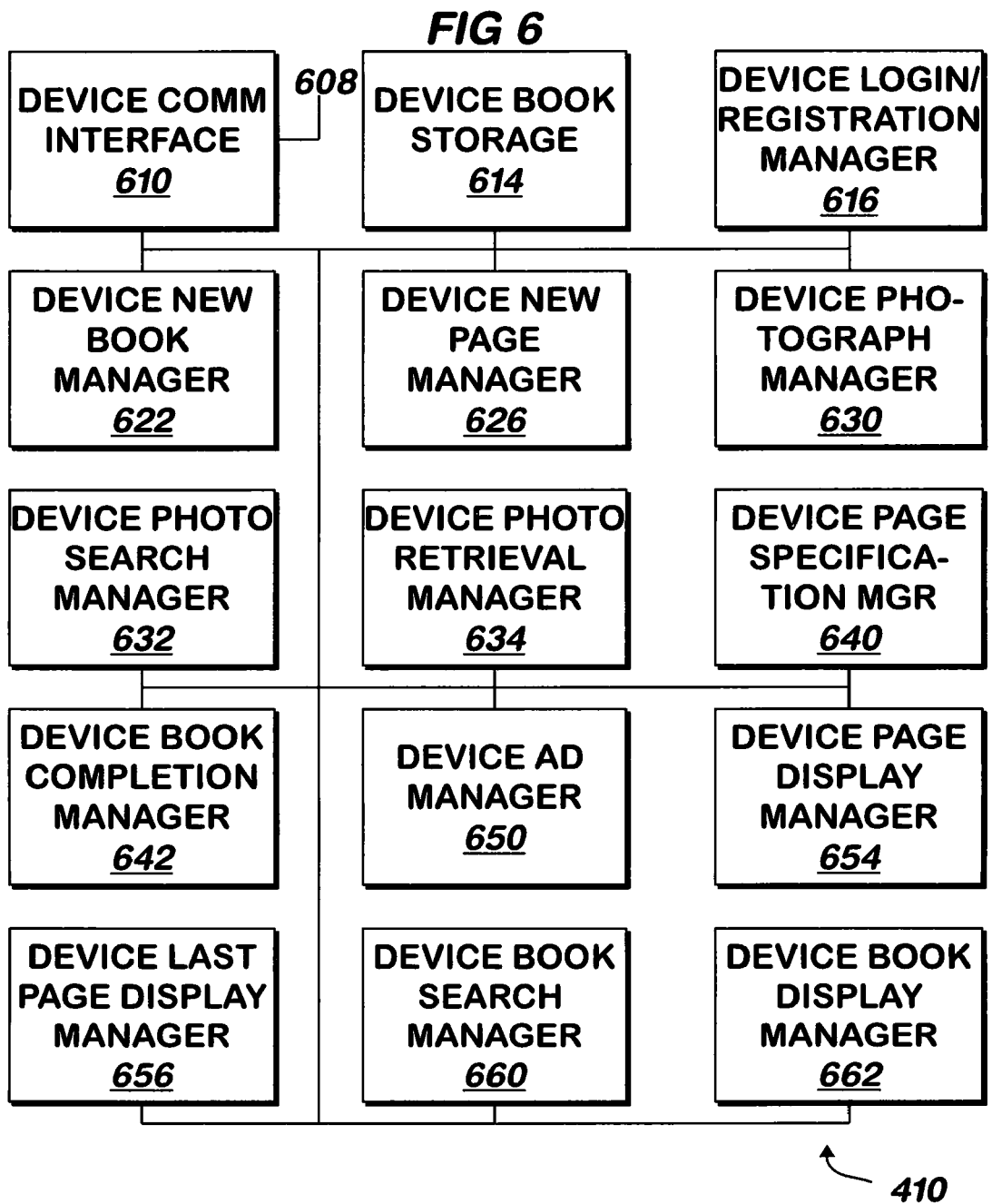

METHOD AND APPARATUS FOR CREATING WEB CONTENT AND IDENTIFYING ADVERTISEMENTS FOR USERS CREATING AND VIEWING CONTENT

CROSS-REFERENCE TO RELATED APPLICATIONS

This application is a continuation of U.S. patent application Ser. No. 13/928,011, filed Jun. 26, 2013, which claims the benefit of U.S. Provisional Patent Application No. 61/665,213, filed Jun. 27, 2012, the entireties of which are incorporated by reference herein.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is related to computer software and more specifically to computer software for content creation and for displaying advertisements.

BACKGROUND

The forms of expression on the Internet are suboptimal. What is needed is a system and method that improves expression on the Internet. Traditional forms of advertising are also suboptimal and a system and method for improved forms of advertising is needed.

SUMMARY

A system and method allows a user to provide registration information if the user desires to create books, and for each page in each book the user desires to create, to specify a photo, and text to be superimposed onto the photo. The photo may be specified as a digital file on the user's computer system or mobile device, a photo in the user's social network account, either supplied to the social account by the user or displayed on the user's newsfeed, the page or pages the user sees when the user logs into their social network account, or the user may enter a search term and the system and method selects and displays to the user publicly available photos corresponding to that search term and allows the user to select one of the displayed photos. Other techniques of specifying a photograph may be used, such as the user specifying a URL of a hosted photograph, or by using a bookmarklet that identifies the URL of any number of images on a web page and allows the user to select one of them. In one embodiment, the user can also indicate that no photo should be displayed. Photos are described herein, however, any image may be used in place of the photos described.

The photo specified by the user is then displayed on a page with a set of user interface controls that allows the user to specify text, attributes of the text such as the font, size, color, justification and opacity of the text, and to specify the color, size, position and opacity of a text box to be displayed over the photo, and over which the text itself will be displayed. All of the specifications are optional, and may include defaults, allowing the user to specify a photo with no text or vice versa. In one embodiment, a user may select one of several predefined templates that each specifies a different combination of such properties.

In one embodiment, the text and the search term can be the same, entered only once, so the photos suggested by the system and method are based on the text that will be displayed over the photo. The search for the photos may be based on a semantic analysis of the text rather than just a simple keyword search.

The user may specify the above information for any number of photos, as well as the order in which the photos are displayed, and may save the set of photos, text and attributes as the pages of a book. The user may specify a title and tags for the book, as well as tags for each set of a photo and associated text in the book. The user may indicate an order for each photo and its associated text and attributes that is different from the order in which the specification for such information was received. In one embodiment, each page of the book is rendered as an image as or soon after it is saved, the image including the photo and the text, formatted as specified.

The system and method generates a link to the book and supplies it to the user who created a book to share with others. The system and method also allows users to search for books for which no links have been provided, and the search function searches for titles, tags, and text, and may include searching for synonyms of the search terms and provides links to books that correspond to the user's search terms (though in one embodiment, a user may elect to not allow a book the user created to appear in searches). When a user clicks a link to a book, each photo, and its associated text and text box that define the pages in the book are displayed to the user in the order specified by the user who created the book by providing rendering instructions to a browser or an application over a network that causes the browser to perform such display. In one embodiment, the pages are displayed one at a time, with user interface controls allowing the user to move forward or backwards one page, though other arrangements may be used. In one embodiment, as the user specifies a different page, animation instructions provided by the server or part of the application are rendered by the user's browser or application to provide the appearance that the pages are turning.

The user is allowed to move past the last page in the book, at which point an additional page is displayed listing biographical information about the user who created the book, links to other books created by that user, and an optional forum that viewers of a book can use to share comments about the book with other subsequent viewers of that book.

Advertisements may be displayed to users who create and view books. The advertisements may be received with categories that describe the user's interests and/or the user's moods or emotions to which the advertiser believes the advertisement will appeal. Such interests, emotions and/or moods may be identified from the content of the books the user has created or read (including the search term used to locate each photo if a search term was used), with a reader who completes a book being correlated considered to be more interested in the subject of the book and having a matching mood than someone who does not complete the book, and an author of the book being even more interested and having a more correlated mood.

In addition to using ads for which the interests, emotions and/or mood of the user match the interests, emotions and moods suggested by the advertiser, advertisements clicked on by other users with similar interests, emotions and/or moods, as identified by the books created and/or viewed, may also be displayed to the user.

In one embodiment, as the user specifies each page, the page is rendered and displayed to the user, within a few seconds. In addition, advertisements are identified within a few seconds of beginning the advertisement identification process and the advertisement is provided for display also rapidly after identification.

BRIEF DESCRIPTION OF THE DRAWINGS

Figure 1:
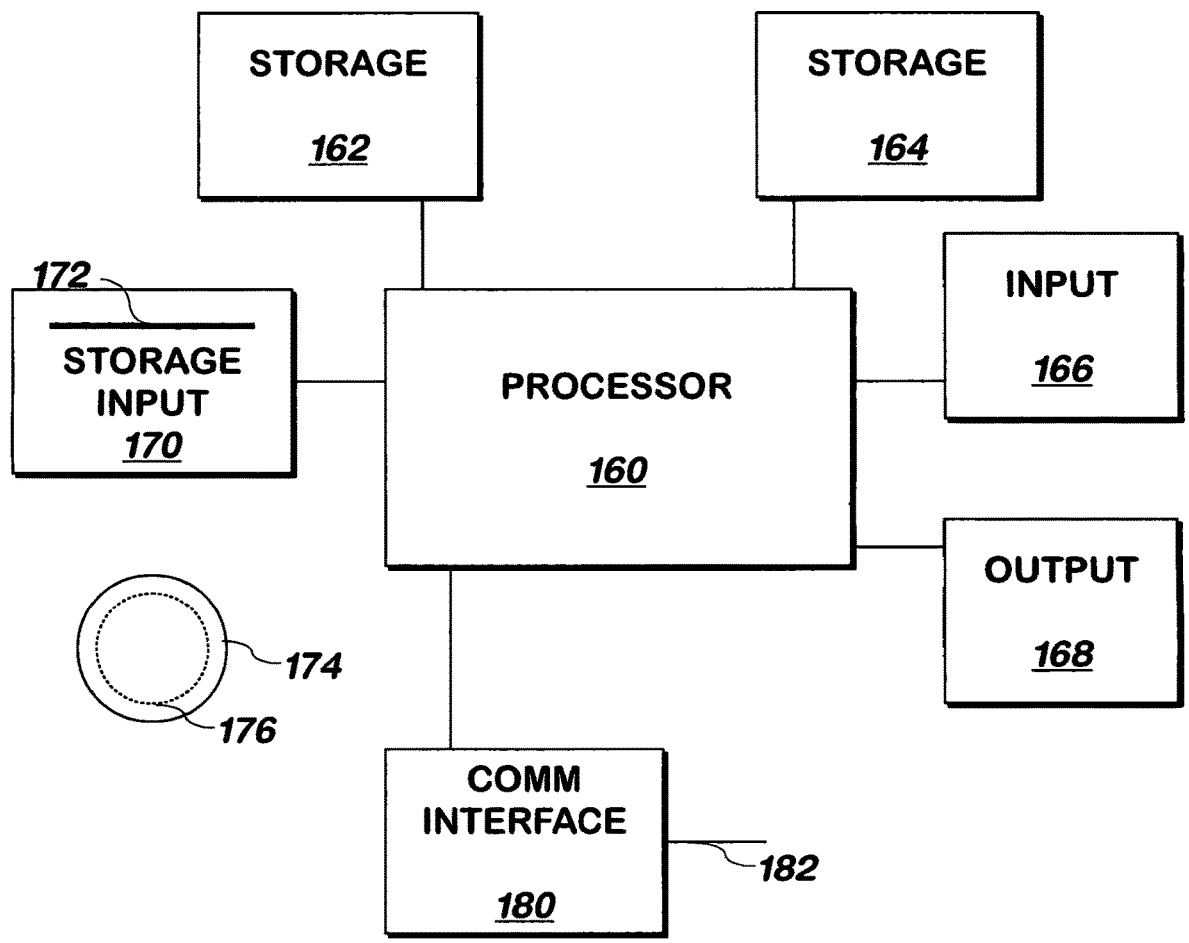
Figure 2A:
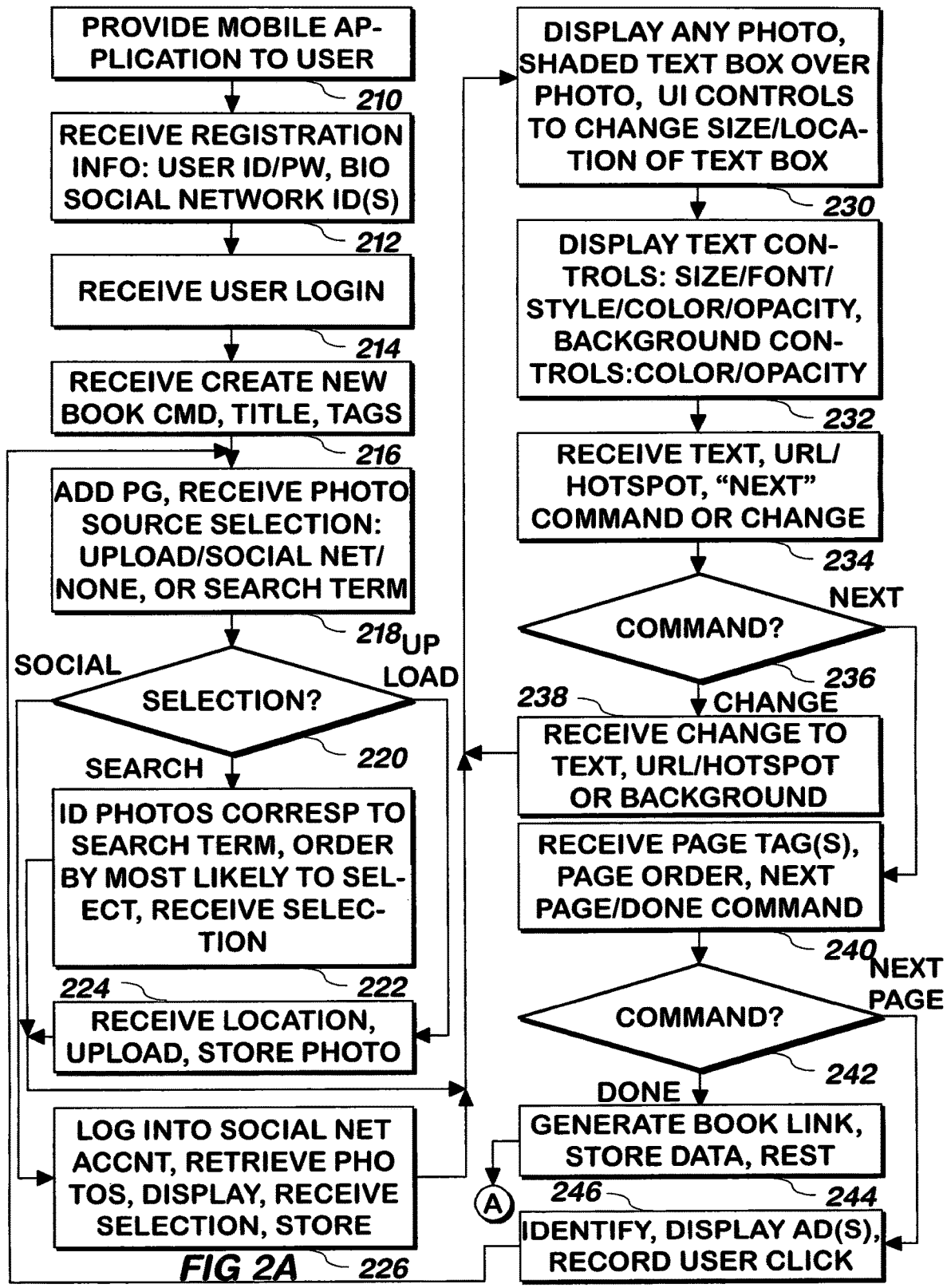
Figure 5A:
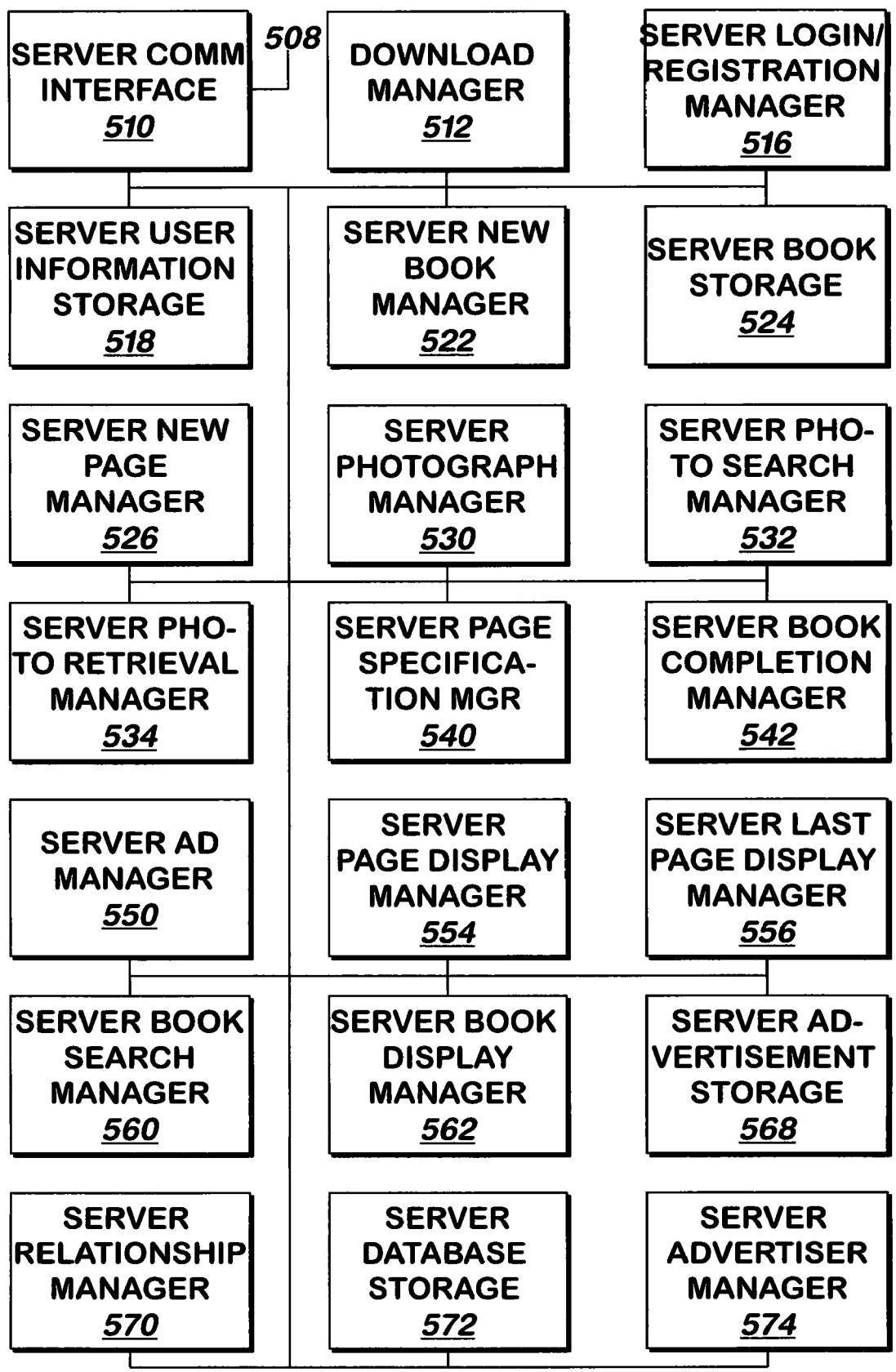
Figure 5B:
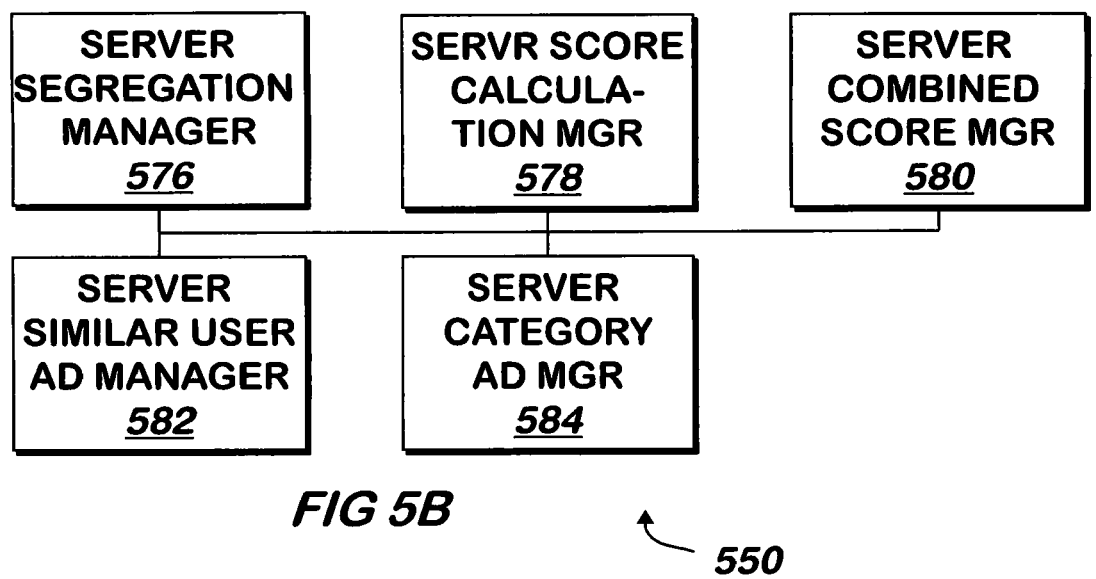

Having thus described certain example embodiments of the present disclosure in general terms, reference will now be made to the accompanying drawings, which are not necessarily drawn to scale, and wherein:

FIG. 1 is a block schematic diagram of a conventional computer system;

FIG. 2, consisting of FIGS. 2A and 2B, is a flowchart illustrating a method of receiving specifications for an online book and for rendering the online book along with advertisements according to one embodiment of the present invention;

FIG. 3 is a flowchart illustrating a method of identifying advertisements to be displayed with pages of an online book according to one embodiment of the present invention;

FIG. 4 is a block schematic diagram of a system for receiving specifications for an online book and for rendering the online book along with advertisements according to one embodiment of the present invention;

FIG. 5A is a block schematic diagram of representative server system of FIG. 4 shown in more detail according to one embodiment of the present invention;

FIG. 5B is a block schematic diagram of a representative server ad manager of FIG. 5A shown in more detail according to one embodiment of the present invention; and FIG. 6 is a block schematic of a user device of FIG. 4 according to one embodiment of the present invention.

DETAILED DESCRIPTION

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both.

Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a DROID 2 mobile telephone commercially available from MOTOROLA CORPORATION of Schaumberg, Ill. running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

FIG. 2, consisting of FIGS. 2A and 2B, is a flowchart illustrating a method of receiving specifications for, and providing rendering instructions for display of an online book and advertisements according to one embodiment of the present invention.

Provide Mobile Application to User.

Referring now to FIG. 2, one or more mobile applications are optionally provided to a user 210. In one embodiment, the mobile application may be provided to the user on a wireless communication device, such as the user's cell phone or tablet computer, and the user may download the mobile application to the user's device in any conventional manner. The mobile application may be provided to, and downloaded by, any number of users on any number of devices at any time.

Receive Registration Information Including User Identifier and Password, User Biography, and Social Network Identifier(s).

Registration information, including a user identifier and password, user biographical information, and social network identifier(s), is received and stored at any time for any number of users and may be updated at any time 212. User biographical information may be any information, such as the user's first and/or last name, age, city/state, and/or any other biographical information, such as conventional author biographical information. In one embodiment, registration information or any other information or comments described herein may be received on the mobile application, such as via the user's cell phone, or it may be received via one or more web pages via a browser on a personal computer. Any social network identifier provided by the user may be received along with the name of the social network or the URL of the social networking website for which such user identifier applies and the password of the social network account. In one embodiment, permission for access to social network information, such social network profile information and social network photographs may be requested and received from the social network account corresponding to any social network identifier provided by the user. Any such social network information may be stored associated with the user's registration information. In one embodiment, steps 210 and 212 are each independently operating processes as indicated by the dashed lines in the Figures.

Receive User Login.

At any time, a user's log in, including the user's user identifier and password received as part of step 212, is received 214 via conventional log in techniques.

Receive Create New Book Command, Title, and Tags.

A command to create a new book is received from the logged in user 216 along with a book title and any book tags. In one embodiment, the option to create a new book may be provided to the user, for example, as a create new book link or button provided on the application or a web page, and the create new book command is received when the user presses the provided link. A suitable user interface is provided to allow the user to enter book title information as well as any number of conventional tags corresponding to the new book.

As described herein, any information provided by the user in the process of creating the book, including tags or any other information, may be recorded, and any information recorded for the user may be used to identify specific advertisements for the user as described below with reference to FIG. 3.

Receive Photo Source Selection: Upload/Social Network/None/Search Term/URL/Bookmarklet.

The first page of the new book is created, and a suitable user interface is provided to allow the user to select a photo source for the photo corresponding to the user's first page, and a photo source selection is received from the user 218. In one embodiment, possible selections for the photo source may include the option to upload a photo from the user's computer, select a photo from the user's social network, not include a photo, or search for a photo using a search term. In one embodiment, if selected, the option to search for a photo from publicly or otherwise available photos using a search term may be received from the user with the search term. As noted above, a photo may be specified, though any image may be used in its place.

If Selection is Upload.

Receive File Location, Upload Photo, and Store Photo.

If the selection received from the user is the option to upload a photo 220, then the file location of the photo is received from the user, the photo is uploaded in a conventional manner, and the uploaded photo is stored 224. In one embodiment, one or more conventional tools for uploading files may be provided to the user to allow the user to provide the location of the photo, such as a file upload dialog box or a conventional bookmarklet as described below. The received location is used to upload the specified photo, and the uploaded photo may be stored, or the location of the photo may be stored, or both.

The user may specify the source of the photo as a file on the user's computer, a photo on a user device, or a URL, and the URL may be provided via a conventional bookmarklet, such as one that identifies the URLs of all images on a web page.

If Selection is Social Network.

Log Into Social Network Account, Retrieve Photos, Display Photos, Receive Selection, and Store.

If the photo source selection received from the user is the option to select a photo from the user's social network account, which may include those provided by the user or those available on the user's social network news feed 220, then social network identifier(s) received with the user's registration information as described above are used to access the user's social network account at the user's specified social network, photos from the user's social network are retrieved and displayed to the user along with a user interface element to allow selection of a photo, the user photo selection is received, and the photo selection is stored 226. In one embodiment, permission to access the user's social network photos may be requested and received, or permission may already have been received from the user when such social network identifier(s) were received as part of step 212. Photos retrieved from the user's social network may be photos posted and/or uploaded to the social network by the user, photos of the user added by the user or by other users, photos added by the user's friends or friends of friends on the social network, or any other photos from the user's social network. In one embodiment, the photos are retrieved and sorted on a basis of how likely they are to be selected by the user, such as in reverse chronological order, and the sorted photos are displayed to the user in order, such as from most likely to be chosen by the user to least likely to be chosen by the user. In one embodiment, the selected social network photo may be stored along with any social network descriptions, tags, and/or comments associated with the selected photo on the social network.

If Selection is Search.

Identify Photos Corresponding to Search Term, Order and Display by Most Likely to Select, Receive Selection.

If the photo source selection received from the user is the option to search for a photo using a search term 220, then photos corresponding to the search term are identified and/or retrieved, displayed in order from most likely to least likely to be selected by the user, and the user photo selection is received and stored 222. In one embodiment, photos are located by matching the search terms received, and/or any synonyms of the search terms, with any titles and/or tags corresponding to photos from publicly available sources. In one embodiment, photos most likely to be selected are those which the search terms match the title words exactly, followed by photos with tags that match the search terms exactly, followed by photos for which the title is a synonym of one or more search terms, followed by photos for which the tags are a synonym of one or more search terms, with photos having more matching or synonym titles or tags being considered more likely to be selected over those with fewer such terms.

In one embodiment, photos may be located using the text of a prior page or the immediately preceding page of the book as one or more search terms, either in addition to an explicit search term the user supplies or instead of any explicit search term supplied by the user. In another embodiment, the user may supply the text to be added to a photo as described herein, before the photo is selected and that text may be used to locate photos or other images that correspond to the text. The photo or image may be identified based on not only the terms in the text but a semantic analysis of the text to identify certain other terms that, separately or together with the text, may be used to locate a photo or image. For example, the text may refer to a dog, but may use terms associated with unhappiness. A photo or other image may be located by searching for those associated with "sad" and "dog", even though the word, "sad" was never used in the text. In one embodiment, photos are displayed as suggestions as the user types.

Display: Any Photo, Shaded Text Box Over Photo, User Interface Controls to Change Size and/or Location of Text Box.

Once the user has uploaded a photo, or selected a photo from the user's social network or from search results or selected a photo from any other source, the selected photo is displayed, and an opaque shaded text box is displayed over a portion of the selected photo, along with one or more user interface controls that allow the user to change the size and/or location of the text box 230. In one embodiment, the shaded text box displayed over the photo may also include a control to remove the text box, such as an 'X' or other icon in the left upper corner of the text box to close the text box. The user interface control(s) to change the size of the text box may include an icon on one corner of the text box which the user may click on and drag to change the size of the text box while maintaining the same proportions, or ratio of the length of the sides, of the text box, as well as an icon on a different corner of the text box which the user may click on and drag to change the size of the text box without maintaining the same proportions of the text box. In one embodiment, the user interface control to change the location of the text box may include clicking any part of the box that is not already specified as another user interface control and dragging the box to its new location.

Display Text Controls: Size, Font, Style, Color, Opacity; and Display Background Controls: Color, Opacity.

Any number of text controls, including controls for the size, font, style, color, justification, and opacity, are displayed, and any number of background controls, including controls for color and opacity, are displayed 232. In one embodiment, background controls are controls which manipulate the background of an optional text box that can be displayed when the photo is viewed as described below with respect to FIG. 2B. For example, the user may set the text and background controls such that a very opaque, black text box is displayed for text that is white or any other light color which may be more visible on a darker background than a lighter background. In another example, the user may use the controls to display a text box that is completely transparent, i.e. completely non-opaque, to create text that appears directly over features of the photograph (neither the text box itself or outline of the text box are visible).

In one embodiment, a user may select from among several initial presets of such controls, which may be fixed, or may be used as starting points for the user to adjust. The initial presets may be grouped with other similar presets to allow the user to select a group and then select one of the presets within the group.

In one embodiment, a "next" or "continue" command may also be provided to the user, such as via a forward arrow or button.

Receive Text, "Next" Command, or Change.

An action is indicated by the user, such as the user entering or changing text, the user identifying a link and optionally a hotspot for the link or the user selecting the "next" command, or the user indicating a change to the current page, and such action or indication from the user is received 234.

If any text or other change to the current page is received from the user via the user interface controls provided 236, then the changes indicated are displayed in a conventional manner, and the method continues at step 230 with the newly implemented changes.

If a URL, and optionally a specification of a hotspot is received, such information is stored associated with the page. A URL specified allows the reader of a page to have the user's browser request the URL. The URL may be caused to be requested if the reader of a page clicks anywhere on the page other than areas for which another user interface control is specified, or it may be requested if the user clicks a part of the page defined by the user, such part referred to as a hotspot. Any number of hotspots may be specified, along with a different or the same URL for each hotspot.

If the "next" command is received from the user 236, then any page tags and the page number or identifier of the current page are received, and a command to add a new page to the book or complete the book may also be received 240. In one embodiment, a suitable user interface is provided to allow the user to provide conventional tags for the photograph, and any tags provided by the user are received and stored with the page identifier. The default page number of the current page may be the order in which the page was created relative to any other pages in the same book. Page data corresponding to the current page may be used to generate a new image which includes the background photograph, any text provided by the user along with the corresponding text size, font, style, justification, color, and opacity of the text, and any additional information regarding the text box in which to display the text including the location, background color, and opacity. The newly generated image may be stored as page data or with page data, and in one embodiment, the page data may be stored with the page number or identifier.

If Add New Page.

Identify and Display Ad(s), Record any User Click.

If a command to add a new page is received 242, then advertisements (ads) may be identified for the user and displayed to the user, and any clicks on any ads displayed to the user are recorded 246. Ads may be identified for the user as described below in FIG. 3. Any click received from the user corresponding to any displayed advertisement is recorded along with the user's user identifier. In one embodiment, the number of times an ad is displayed to the user is also recorded. The method continues at step 218.

If Done.

Generate Book Link, Store Data and REST Information.

If an indication is received that the user is done creating the book 242, then a link to the book is generated, and any page data for the book is stored associated with the generated link and/or REST information included in the generated link 244. In one embodiment, step 242 may include receiving an indication as to whether a forum should be appended to the end of the book, the forum allowing others who view the book to post comments, and the indication is stored with the other information for the book. The method continues at step 216.

Receive Request for Book.

At any time, a request to view a book may be received 250. In one embodiment, the request to view a book may be received as a click on a link to a book previously generated and displayed as part of step 244, and the request may be received from a registered user or an unregistered user. When the user requests to view a book by clicking on a link to a book, the user may be identified using conventional cookie techniques. In one embodiment, if no cookie is stored for the user requesting the book, then one or more cookies may be stored to the user's computer including a reader identifier which may be retrieved and used to identify the user if the same computer is used to view a book or other pages from the same book at a later time. In one embodiment, books may be viewed by registered users or unregistered users, and the reader identifier stored and used to identify the user viewing the book may or may not match a registered use identifier, such as that associated with a user creating a book above.

Select First Page.

The requested book is identified, and the first page of the identified book is selected 252. In one embodiment, REST information included in the link is used to identify the requested book and retrieve page data corresponding to the first page of the requested book. REST information may include information to the right of a slash to the right of the top level domain of a URL in the link.

Render Page, Including Title, Image Overlaid with Text from Selected Page, and Navigation User Interface.

Commands for rendering the selected page or the image generated and stored corresponding to the selected page are identified based on the stored page data, the commands or image are provided to a browser or the application via the network, and the selected page is rendered and/or displayed 254, including the title of the page, the image or photo of the page overlaid with the text of the page, and any navigation user interface controls. In one embodiment, page data corresponding to the selected page is sent from a network server to the user's computer, and the selected page is rendered and/or displayed by the user's browser or application described above using such page data. Navigation controls provided as part of the commands and rendered may include a "next page" or forward button, a "previous page" or back button, and any number of other navigation buttons or links.

Identify and Display Ad(s), Record Clicks, Pages.

One or more advertisements are identified for the user, identifiers of such Alanna DeSalvo recorded associated with the identifier of the user and the date and time, the ads are provided to be rendered over the network along with commands to cause them to be rendered, and such one or more advertisements are displayed along with the rendered page, and any user clicks on advertisements are recorded for the user 256. The page number of the selected page, or the total number of pages up to the selected page of the book that the user has viewed, is also recorded 256. In one embodiment, ads are identified for the user as described below with reference to FIG. 3.

Receive Navigation Command, Select Page, and Animate Flip.

A navigation command is received from the user, a new page is selected based on such navigation command, and a flip to the newly selected page may be animated 258. In one embodiment, the navigation command may be received via a click on the "next" or "previous" buttons provided as part of the navigation controls. For example, the "next" command selects the next page of the book and animates a flip to the next page. The animation may be performed via commands supplied with either or both of the current and next page, may be supplied separately, may be performed natively by the application and not supplied, or no animation may be displayed.

If Selected Page is the Last Page of Book.

Display Author Bio, Links to Other Books by Same Author, and Forum.

If the newly selected page is past the last page of the book 260, then biographical information corresponding to the author or creator of the book is displayed, along with any links to other books created by the same author and one or more forums, such as a forum for comments to the book 262. In one embodiment, comments to any forum may be posted by registered users as well as unregistered users. Biography information corresponding to the author or creator of the book may have been received from the author of the book as part of registration at step 212.

If Selected Page is not the Last Page of Book.

If the newly selected page is not the last page of the book 260, the method continues at step 254 using the newly selected page.

Identify Ad(s) Record Clicks, Forum Read, Forum Posts.

Ads are identified for the user (as described below with reference to FIG. 3), the identified ads are recorded and provided as described above, the ads are displayed, and any user clicks on the displayed ads are recorded 264. Any comments or other posts made on the provided forum are also recorded, as well as any indication whether the user read or clicked a link to any forum 266.

Identify Ad(s) and Record any Clicks, Forum Reads, Forum Posts.

FIG. 3 is a flowchart illustrating a method for identifying and displaying advertisements likely to be clicked on by users creating and/or viewing the pages of books as described in FIG. 2 according to one embodiment of the present invention. Referring now to FIG. 3, any number of category groupings, synonym groupings, and/or related words groupings are received and stored 310. In one embodiment, such groupings may be received as word tables that are helpful in identifying possible user interests or subjects that users may be interested in, as well as user emotions and/or moods. Examples of categories or category groupings may include "Things People Say When They Are Happy Or Excited" or "Words People Use When They Are Sad" or "Things Athletes Say." Such groupings include words and phrases that correspond to a user's interests, emotions and/or moods. Synonym tables may include tables that list synonyms for category words or words included in category groupings. Related words groupings are groups of words related to a topic. For example, a table for words related to sports may include words such as "net," "ball," "racquet," "sneakers," "team," and/or any other sport-related words. The process of receiving category, synonyms and/or related words groupings may be an independently operating process as shown by the dashed lines in the Figure.

Receive Ad(s)/Categories for Ad(s).

At any time, any number of advertisements may be received from advertisers, along with any number of categories or category words that correspond to such ads 312. In one embodiment, possible category words corresponding to ads may be provided to ad providers as words that describe the users or types of users most likely to click on such ad, and ad providers may select the category words that apply to specific ad(s) from the choices offered. In one embodiment, category words describing ads may generally match or be mapped to category words that are associated with photos as described above with reference to FIG. 2. In one embodiment, the categories may include interests, emotions and moods. For example, an ad may appeal to someone who is sad about their pet, and so the advertiser would indicate an interest category of "pet" and a mood or emotion category of "sad". The process of receiving advertisements and/or category words corresponding to advertisements may be an independently operating process as shown by the dashed lines in the Figure.

Segregate and Identify Recent Actions; Identify Scores for Make/Read: Same Photos/Same Photo Categories, Same/Similar Tags, Text, Words, Word Categories; Read: Finish, Like, Comment.

Using any, some or all of information recorded for the user and for other users when creating or viewing any books as described above with reference to FIG. 2 (e.g. tags for pages and/or books created or viewed, categories of photos or books, text words entered in books), as well as any user ad preference information, such as any recorded clicks on advertisements (e.g. any clicks recorded at step 246 and/or step 256 of FIG. 2), other users are segregated into a group of segregated users or other users that are easily and quickly identifiable as similar to the user 314. For example, in one embodiment, other users that are included in the segregated users group may be other users whose recent actions indicate that they have created or read the same book as the user, or created or read one or more books with the same title as the user, or created or read one or more books with a similar title as the user, or any other method may be used to segregate the group of scored users. To identify the group of segregated users, the most recent actions of the user may be identified, and such recent actions may be compared to the recent actions of other users. In one embodiment, the number of segregated users for a user is limited to an upper limit bound such as 1000 of the closest identifiable users. Users are considered to be closer to a user if they read the same book than they are if they read a book with a similar title. Users who created books with the same or similar title are considered to be more similar than users who read a book with the same or similar title as another user. Users who read all pages of a book are considered to be more similar than users who did not, and users who did not read all pages of a book are considered to be more similar to other users who did not than to users who read all pages.

Additionally as part of step 314, one or more similarity scores are determined for each segregated user relative to the user for which one or more ads are being identified, including a photo categories score, similar tags score, text words score, word categories score, finish/like/comment score, and any other similarity scores. In one embodiment, recent actions of users may be used to determine similarity scores or all previous actions may be used, or any other group of previous actions may be used. Similarity scores may be any scores that indicate a level of similarity between a segregated user and the selected user based on any similarity criteria, including any photos or categories of photos used or viewed by each user, any tag words including photo tags or other tags used or viewed, any text words used or viewed, or any other words, such as words used in comments, as well as any information corresponding to books read and/or liked and/or commented on by each user, or any other information recorded for each user.

In one embodiment, a segregated user that has viewed a higher number of similar photos as the user, including the same photos as the user or photos from the same or similar photo categories as the user, may be assigned a higher photo categories score than a user that has viewed fewer similar photos as the user. Additionally, if a segregated user has included one or more of the same or similar photos in his/her book(s) as any photos included in book(s) made by the user, then such segregated user may receive a higher photo categories score than a segregated user that has not included similar photos or a segregated user that has only viewed similar photos as the user.

A higher tag words score may be assigned for a segregated user that uses many of the same or similar tag words for photos or books or any other tags as the selected user than another segregated user that uses fewer similar tag words. A higher text words score may be calculated for a segregated user that writes or reads many of the same words when creating books or viewing books as the selected user than another segregated user who writes or reads few of the same text words. The synonym table may be used to identify similar words.

Similarity scores may also be determined by the level of interest demonstrated by each user in any subject in which both users demonstrate some interest. For example, creating or making similar books on the same subject may indicate a higher level of similarity between the two users than if the user made a book on the subject and the segregated user only viewed a book and did not make a book on the same subject. The related words table may be used to identify words used in tags or titles or text that are of a similar subject.

Weight Scores, Multiply Scores by Weight, and Identify Similarity Score.

Weights are assigned for each similarity score, similarity scores are multiplied by their corresponding weights, and the weighted scores are used to determine a total similarity score for each segregated user 316. In one embodiment, initial weights assigned to similarity scores may be equal, and conventional regression analysis is used to determine which factors are highly indicative of the likelihood of a user clicking on any ad, and such analysis may be used to adjust weights accordingly from time to time.

Identify Advertisements with Highest Clickthrough Rates by Other Users with High Similarity Scores.

Ads, such as the ads with the highest clickthrough rates by segregated users with high similarity scores, or ads which have been most frequently clicked on by users that are very similar to the selected user, are identified for the selected user 318. To identify ads with the highest clickthrough rates by users with high similarity scores, a score bucket for each advertisement may be used to accrue similarity scores. In one embodiment, a segregated user's similarity score (relative to the user) is added to each score bucket corresponding to ads that the segregated user has clicked on. Ads corresponding to score buckets with the highest similarity score are identified as ads to display based on similarity with the user for which one or more ads are being identified.

Identify Other Ads Using Ad Category, Words in Actions, Categories of Photos.

In one embodiment, not only are ads identified using users with similar interests, emotions and/or moods, but advertisements may be also identified that only match the advertiser-supplied categories with the users interests, emotions and/or moods. Either or both types of advertisements may be displayed to the user. If only one advertisement is displayed to the user, the advertisement may be selected at random from those identified as described herein.

Additional advertisements are identified 320 for the user using category words corresponding to ads received as part of step 312 and relating such words to words used or identified in actions of the user 320. In one embodiment, the words used or identified in actions of the user include words the user provided or viewed during the process of making or viewing books, such as any text provided or viewed, or any tag words for pages created or viewed, as well as any category words, synonyms and/or related words corresponding to the words used in actions by the user. Category words corresponding to ads received as part of step 312 may be compared with any category words, synonyms and/or related words identified from words used in actions by the user to identify advertisements likely to appeal to the user. In one embodiment, ads corresponding to category words that match words corresponding to recent actions of the user may be identified as more likely to be clicked on by the user than ads corresponding to category words that do not match words from the user's recent actions. In one embodiment, similar or related words may be identified from the user's words in action using the category, synonym, and related words groupings information received as part of step 310.

Ads identified for the user in such a manner using category words may include ads not previously identified for the user as part of step 318, such as any new ads or ads with lower clickthrough rates that are likely to clicked by the user or any other ads.

In one embodiment, a level of interest demonstrated by the user through the user's recent actions may also be used in identifying ads most likely to be clicked on by the user. The user's level of interest corresponding to a category identified in the action(s) of the user may be determined by the type of action and/or the number of actions that such user makes corresponding to such word. Creating or making a page corresponding to a category may indicate a higher level of interest than just viewing a page corresponding to that category. Commenting on a book associated with a category may indicate a higher level of interest than only viewing the book, viewing multiple books associated with a category may indicate a higher level of interest than viewing only one book associated with the category, reading a whole book associated with a category may indicate a higher level of interest than viewing only some of the whole book, and/or taking more of any actions indicating an interest in a category may indicate a higher level of interest than taking few or no such actions. For example, a user that views every page of a thirty page book that includes the tags "pets" and "animals," who likes the book, and comments on the book indicates a higher level of interest in "pets" and "animals" than a user who views only four pages of the same book. In such a case, advertisements for dog collars and/or cat houses may be identified as most likely to be clicked on for the first user and not for the second user.

As described herein, books of pages, and an extra page at the end, are displayed to the user upon creation and upon viewing, and advertisements are identified and also displayed to the user. Commands that will cause the various pages and advertisements to be rendered are identified in less than a few seconds, so that books may be created and viewed quickly and advertisements are updated rapidly as additional information is discovered about each user's interests, emotions and moods. There may be any number of users who use the system and method of the present invention.

The code for authoring a page of a book is shown in Appendix A according to one embodiment of the present invention. The code for viewing a page of a book is shown in Appendix B according to one embodiment of the present invention. Other methods of coding such application may be used. In one embodiment, the code used is HTML5 code to be used to allow viewers to view the books from any browser.

System.

FIG. 4 is a block schematic diagram of a system for receiving specifications for, and providing rendering instructions for display of an online book and advertisements according to one embodiment of the present invention.

FIG. 5A is a block schematic diagram of representative server system 420 of FIG. 4 shown in more detail according to one embodiment of the present invention.

FIG. 5B is a block schematic diagram of a representative server ad manager 550 of FIG. 5A shown in more detail according to one embodiment of the present invention.

FIG. 6 is a block schematic diagram of a representative user device 410 of FIG. 4 shown in more detail according to one embodiment of the present invention.

Referring now to FIGS. 4, 5, and 6, in one embodiment, the system of FIG. 4 contains any number of user devices 410, a server system 420, and third party servers 440, though other arrangements may be used. User devices 410, server system 420, and third party servers 440 operate as described herein, and each system 410, 420, and each include a respective communication interface 606, 506, (not shown in the third party servers 440), each of which may include a conventional communication interface running suitable communication protocols, such as Ethernet, TCP/IP or both. In one embodiment, unless otherwise noted herein, all communications in and out of the user devices 410 and server system 420 are made via input/output (not shown) of the communication interface of third party servers 440, input/outputs 507, 508 of communication interface 510, and input/output 608 of communication interface 610, the inputs/outputs of all systems coupled to network 430, which may include a conventional Ethernet network, the Internet or both.

A user communicates with server system 420 using user device 410, which may include a conventional personal computer system with a conventional browser coupled to the Internet using suitable communications techniques, or a conventional wireless communication device, such as a cell phone or a tablet computer, running a conventional browser. In the case of a cell phone or tablet, the user may download an application to the device 410 using device download manager 512, which may include an "app store" or "market" coupled to the Internet using suitable communications techniques. The user may download the application in a conventional manner via download manager 512, such as by purchasing and/or selecting the application at an online mobile application store.

The user registers at server system 420 using the user device 410. The user may either use the downloaded application to perform actions described herein, or the user may use a browser on the user device 410. In one embodiment, server log in/registration manager 516 provides a web page including one or more links to indicate one or more actions, such as a link to register or log in. In one embodiment, if the user is registering via the mobile application, device log in/registration manager 616 provides the buttons or links or other user interface elements to allow the user to indicate actions, and device log in/registration manager 616 relays any information received from the user to the server log in/registration manager 516 and vice versa.

If the user provides an indication to register an account, such as by clicking the link or button provided, server log in/registration manager 516 provides one or more web pages containing suitable user interface elements to allow the user to provide registration information, including a user identifier and password, biographical information, social network identifier(s), and any other registration information, as described above. The user provides such information, and server log in/registration manager 516 receives the information and stores such information in server user information storage 518 associated with the user identifier. All storage elements described herein such as server user information storage 518 may include conventional memory and/or disk storage.

If the user provides registration information via the mobile application, device log in/registration manager 616 receives the registration information from the user, internally stores it, and forwards the received registration information to server log in/registration manager 516 with the user's user identifier or a device identifier. Server log in/registration manager 516 receives the registration information described above, either directly from the user or via device log in/registration manager 616, and stores the registration information in server user information storage 518.

Server log in/registration manager 516 may receive registration information from any number of users at any time.

Other elements of user device 410 communicate with elements of server 420 in a similar fashion so that users can interact with the server either via the mobile application or via a browser. When using an element of the mobile application, the element provides the user interface.

Any registered user may log in to server system 420 using conventional log in methods at any time, either directly through server log in/registration manager 516, such as via one or more web pages provided by server log in/registration manager 516, or through server log in/registration manager 516 via device log in/registration manager 616. In one embodiment, the user provides the user identifier and password previously registered above and presses the log in link or button on the user interface provided. Server log in/registration manager 516 receives the user log in and may store a cookie on the user's computer, including the user identifier, and such cookie may be retrieved by other elements of the system described herein to identify the user or device log in/registration manager 616 stores the user identifier internally and makes it available to other elements of the user device 410.

Once the user is logged in, the user may provide an indication to create a new book, such as by pressing a create new book link or button provided. Server new book manager 522 receives the create new book command and provides one or more web pages containing suitable user interface elements to allow the user to provide new book information, including any book title and/or book tags, as described above. The user provides the new book information, and server new book manager 522 receives it and stores it in server book storage 524 associated with the user identifier and a book identifier. In one embodiment, server new book manager 522 retrieves the user identifier with the cookie stored on the user's computer or other device.

In one embodiment, the create new book command may be received at the user's user device 410 by device new book manager 622, and device new book manager 622 may provide the user interface to allow the user to provide, and device new book manager 622 to receive, the new book information as described above. Device new book manager 622 may forward such information received from the user to server new book manager 522 along with the user identifier or a device identifier.

The web page(s) provided by server new book manager 522 may also include a button or link to add a new page which signals server new page manager 526. When the user clicks the add new page button, server new page manager 526 provides a web page containing suitable user interface elements to allow the user to select a photo source as described above. In one embodiment, the web page provided by server new page manager 526 may include one or more links corresponding to one or more options, such as an upload photo link, a choose social network photo link, a search for photo using search term link, which may include a user interface element, such as a text field, allowing the user to provide a search term or the text to be used on the photo and submit the search term or other text by pressing the link, a supply a URL text box, a no photo link, or any number of other photo source links or other user interface elements that perform the functions described above. In one embodiment, server new page manager 526 may identify the user via the cookie(s) stored on the user's computer or device as described above, and server new page manager 526 may retrieve the book and page identifiers most recently stored corresponding to such user identifier in server user information storage 518. As described herein, any elements may identify the current and/or most recent book(s) and/or page(s) of books(s) created by the user (or read by the user as described in more detail above and below) in a similar manner. If the user has supplied text, server new page manager 526 stores the text in server book storage 524.

In one embodiment, device new page manager 626 may receive the indication to add a new page via a user interface element provided by device new book manager 622 or device new page manager 626 on the mobile application, and device new page manager 626 provides the user interface to allow the user to select a photo source. Device new page manager 626 forwards any information received from the user to server new page manager 526 with the user identifier corresponding to the user from which information is received, and device new page manager 626 displays any information received from server new page manager 626 in response.

In one embodiment, if the user selects the option via the link not to include a photograph, such as by clicking the no photo link, server page specification manager 540 receives the click, and displays the text box, described above and below, over a default blank photo or no photo.

If the user selects the option to upload or identify the URL or other location of a photo as described above, such as by clicking the upload photo link, server photograph manager 530 receives a request corresponding to the click and provides a suitable user interface, such as a conventional uploading tool or a text box, or a bookmarklet as described above, to allow the user to provide the location of the photo. The user provides the location of the photo using the uploading tool or text box, server photograph manager 530 uploads or retrieves the photo as specified by the user and stores the photo in server book storage 524 associated with the user identifier, book identifier and a page identifier, and server photograph manager 530 signals server page specification manager 540. In one embodiment, server photograph manager 530 may store the location of the photo or the photo or both. In one embodiment, the user may upload the photo using the mobile application via device photograph manager 630, and device photograph manager 630 forwards any information received from the user, and optionally, the photo itself, to server photograph manager 530 with the user's user identifier.

Device photograph manager 630 also provides user interface elements to allow the user to specify a photo via a search or to retrieve a photo from a social network via buttons that signal device photo search manager 632 or device photo retrieval manager 634, respectively.

If the user selects the option via the link to choose a photo from the user's social network, such as by clicking the choose social network photo link or button, server photo retrieval manager 534 receives a request corresponding to the click and logs in to the user's social network using social network information received from the user and stored associated with the user identifier in server user information storage 518 and retrieves social network photos as described above. Server photo retrieval manager 534 displays the retrieved social network photos, as described above, along with user interface elements to allow the user to select a displayed photo, such as by clicking on the photo or clicking on a thumbnail of the photo. In one embodiment, the retrieved photos may be displayed as a grid of photos or thumbnails of photos, and the photos may be displayed such that photos more likely to be selected by the user are displayed first, as described above. The user selects a photo from the social network photos displayed, and server photo retrieval manager 534 receives the user photo selection and stores the selected photo in server book storage 524 along with the user identifier, book identifier and a page identifier. Server photo retrieval manager 534 may also retrieve any title information and/or tag information and/or other information associated with the retrieved photo and store such information associated with the photo in server book storage 524.

In one embodiment, device photo retrieval manager 634 provides the user interface to allow the user to choose a social network photo as described above, and device photo retrieval manager 634 relays any information from the user to server photograph manager 530, and vice versa, with the user's user identifier.

If the user selects the option to search for a photo from one or more photo databases using a search term, such as by providing a search term or the text to be displayed with the photo as described herein and clicking the search for photo link, server photo search manager 532 receives the search term or text and identifies photographs corresponding to the search term or text, as described above, orders and displays the identified photos from more likely to be selected by the user to less likely to be selected by the user, as described above. The user selects a photo as described above, server photo search manager 532 receives any user photo selection, and stores the selected photo in server book storage 524 associated with the user identifier, book identifier and a page identifier. In one embodiment, server photo search manager 532 stores the received search term or text corresponding to the photo in server book storage 524 associated with the photo, and may also retrieve any tags associated with the selected photo and store such tags associated with the photo in server book storage 524.

In one embodiment, the user may provide the indication and search term or text to be displayed to device photo search manager 632 using the mobile application and device photo search manager 632 may display the photo selection grid of photos matching the search terms or text and user interface elements to the user on the user's mobile device. Device photo search manager 632 relays information from the user to server photo search manager 532, and vice versa, with the user's user identifier.

In one embodiment, any search performed by the user, including any search terms or text provided by the user, may be recorded as a user action in server user information storage 518 associated with the user identifier.

When server photograph manager 530 has uploaded and stored the user's photo selection or received an indication no photo will be used, or when server photo retrieval manager 534 or server photo search manager 532 has received and stored the user's photo selection, the element storing the photograph signals server page specification manager 540.

Server page specification manager 540 receives the signal and displays any selected photo for the page and displays a shaded text box over the selected photo (or blank or colored page if no photo), including any text received from the user, and the user interface controls to change the size and location of the text box as described above. To display the selected photo and text box, server page specification manager 540 may identify the user's user identifier via the cookie stored on the user's device, and identify the book identifier and page identifier most recently stored associated with the user identifier in server user information storage 518. In one embodiment, server page specification manager 540 retrieves the photo and any text stored in association with such book identifier and page identifier in server book storage 524, and server page specification manager 540 displays the retrieved photo, as well as any text, if such text has been received from the user and stored, as described above.

Server page specification manager 540 also displays user interface controls to change the size, font, style, justification, color, and opacity of the text, as described above, the color and opacity of the text box background, or select one of several default settings of such controls, as described above, and other commands, such as a "next" or "add page" command, as described above. When the user adds any text or makes any changes to any text on the page using the text box provided, server page specification manager 540 receives such text or changes and displays such text and changes instantly or near-instantly to the user. If the user provides an indication to move on to the next step, such as by pressing the "next" button, server page specification manager 540 receives such indication and may prompt for any page tags and/or page order information for the current page. In one embodiment, server page specification manager 540 renders or generates a new image which displays the selected photo with the finalized set of modifications to the photo, text box, and any text corresponding to the selected photo as they have been received from, and displayed to, the user. Server page specification manager 540 stores the newly rendered image corresponding to the page just completed in server book storage 524 as page data associated with the user identifier, book identifier and page identifier corresponding to such page. In one embodiment, server page specification manager 540 may store other or additional page data corresponding to the page in server book storage 524, including any display information such as the location coordinates and size of the text box and any text and/or text formatting information corresponding to the text box as described above.

In one embodiment, server page specification manager 540 provides user interface controls to allow a user to select one of several templates that contain predefined values of the settings described above that are internally stored by server page specification manager 540. If the user selects one of the templates, server page specification manager 540 uses the predefined values of the settings from the selected template as initial values for such settings, though the user may change them as described herein.

Server page specification manager 540 may also provide suitable user interface elements to allow the user to provide any page tags, as well as the page order of the selected page relative to the book. The user provides such information, which server page specification manager 540 receives and stores associated with the user identifier, book identifier and page identifier in server book storage 524. The user may indicate to define a next page of the book, such as by clicking a "next" button provided by server page specification manager 540, or the user may indicate that he/she is done creating the book, such as by clicking a "finished" button provided by page specification manager 540. In one embodiment, the "next" button signals server ad manager 550, and the "finished" button signals server book completion manager 540.

When signaled, server ad manager 550 identifies one or more ads that are likely to be clicked on by the user, as described in more detail above and below, and provides such ads to server page specification manager 540, which receives the ads and displays the ads as described above. Server page specification manager 540 stores any click or clicks on any displayed ad(s) in server user information storage 518, and server page specification manager 540 may also record which ads are shown to the user and how many times any ad is shown to the user even if the user does not click on it, as described above. When server page specification manager 540 has displayed the ads identified for the user and recorded any clicks as described above, it signals server new book manager 522, and server new book manager 522 adds a new page and receives a new photo source selection for the new page and repeats the procedure as described above.

When server book completion manager 540 receives a click on the "finished" button, server book completely manager 540 generates and provides to the user a book link for the completed book, including REST information, and stores the generated link and/or REST information in server book storage 524 associated with the user identifier and book identifier. REST information is the information to the right of the slash after the top level domain name in the URL.

In one embodiment, if the user is creating the page using the mobile application, device page specification manager 640 displays the selected photo, overlaid shaded text box, and user interface controls similar or identical to those described above, and device page specification manager 540 receives and instantly or near-instantly displays the book page resulting from any text and/or changes and/or commands received from the user via the mobile application. In one embodiment, device page specification manager 640 sends page data corresponding to a new page to server page specification manager 540, along with the user's user identifier, when the user indicates that he/she is done editing a page as described above. Server page specification manager 540 renders the image using the received page data and saves the rendered image and the page data corresponding to the page as described above.

Device page specification manager 640 signals device ad manager 650, which requests and receives ads (e.g. those selected for the user as described herein) ads as described in more detail above and below from server ad manager 550 and displays such ads to the user. Device ad manager 650 receives user clicks on such ads, and transfers the user to a web page corresponding to such ad via a browser, not shown, on the user device and a URL received from server ad manager 550, associated with the ad. In addition, device ad manager 650 indicates the clicks and the user identifier of the user who clicked on the ad to server ad manager 550, which stores such information and the date and time in server user information storage 518.

If the user completes the book using the mobile application and provides an indication of such, device book completion manager 642 provides the indication to server book completion manager 542, which receives it and generates and stores the link to the book as described above and provides it to device book completion manager 642, which displays it to the user.

At any time, server book display manager 562 may receive any number of requests to view any number of books from any number of users. When server book display manager 562 receives a request to view a book, it attempts to identify the user requesting the book, such as by using conventional cookie techniques. In one embodiment, the user may be a registered user or an unregistered user. If the user is a registered user as described above and logs in using conventional log in techniques and a registered user identifier and password, server log in/registration manager 516 receives the user log in and stores a cookie including the received user identifier on the user's device. If the user is not logged in as a registered user, server log in/registration manager 516 may retrieve an unregistered user identifier using conventional cookie techniques, or if no such cookie is available, server log in/registration manager 516 may store cookie information including an unregistered user identifier on the user's computer.

In one embodiment, server log in/registration manager 516 provides suitable user interface elements, such as a text field and a search link specifying server book search manager 560, to allow a user to search for a book using one or more search terms. When the user provides the search terms and clicks the link, server book search manager 560 receives the click and the search terms from the user and identifies books in server book storage 524 with titles, text, and/or tags that most closely match the received search terms or synonyms of the received search terms, as described above. Server book search manager 560 generates any number of links that each cause the user's browser to request a specific book from book display manager 562, such as any books identified as closely matching the user's search terms. In one embodiment, the user may click a link provided by server book search manager 560 to request a book, or the user may request a book from book display manager 562 by pasting or entering a link into the user's browser.

In one embodiment, if the user searches for a book and/or requests a book using the mobile application, then device log in/registration manager 616 provides user interface elements to such requests and signals device book search manager 660 which provides the user interface to search for the book as described above. Device book search manager 660 receives any search terms provided by the user and forwards any such information to server book search manager 560 which performs the search as described above and returns the results to device book search manager 660, which displays them as a series of links and descriptions, and optionally one or more pages from the book. If the user clicks a displayed link, device book search manager 660 indicates the book corresponding to the selected link to device book display manager 562. Device book display manager 662 receives any requests to view a book and forwards the received request to server book display manager 662.

Server book display manager 562 receives the request to view a book, including a book identifier corresponding to the requested book, and server book display manager 562 provides the book identifier and a page identifier to server page display manager 554, which receives the book identifier and page identifier and provides page data, such as the image rendered and stored associated with the received book identifier and page identifier in server book storage 524 or other page information such as HTML code to instruct the user's browser to render the page corresponding to the received book identifier and page identifier if the page has been requested using a browser.

Or if the page is requested by the user via the mobile application, server page display manager 554 provides the page data, which may include the rendered image and/or other rendering instructions specific to the mobile application, corresponding to the requested page, as well as any other page information corresponding to the requested page, to device page display manager 664, which receives the page data, stores the page data in device book storage 614 associated with the book identifier and page identifier and displays the received rendered image or renders the image using the received rendering instructions associated with the requested page as described above. The user's browser or mobile application displays the requested page including the title, image, overlying text, and any navigation user interface controls corresponding to the selected page as described above.

Additionally, server page display manager 554 signals server ad manager 550 to identify ads identified for the user viewing the displayed page as described above. In one embodiment, server page display manager 554 signals server ad manager 550 with the user identifier corresponding to the user viewing the page. Server ad manager 550 receives the signal and user identifier and server ad manager 550 identifies ads for the user as described in more detail above and below. Server ad manager 550 provides one or more ad identifiers corresponding to ad(s) identified for the user viewing the page as described above and below to server page display manager 554.

Server page display manager 554 receives any ad identifier(s) corresponding to ad(s) identified for the user from server ad manager 550, and server page display manager 554 retrieves the HTML and/or any other data corresponding to the received ad identifier(s) in server advertisement storage 568 and provides commands to the user's browser to render the ads identified for the user. Any ad information including any HTML and/or any other rendering data or other data corresponding to any ads may be stored in server advertisement storage 568 as described in more detail above and below.

In one embodiment, if the user is using the mobile application to view the page as described above, each time it displays a page or receives a page definition, device page display manager 654 signals device ad manager 650 to identify ads for the user as described above, and device ad manager 650 receives such signal and forwards the signal to server ad manager 550 with the user identifier or device identifier corresponding to the user and/or device viewing the page via the mobile application. Server ad manager 550 receives the signal and user identifier from device ad manager 650, identifies the ad(s) in the manner described above and below, and provides rendering information to render the ad it identifies for the user to device ad manager 650, which receives the ad and provides the ad rendering information to device page display manager 654.

Each time it identifies one or more ads, server ad manager 550 stores in user information storage 510 identifiers of such ad, the user for which it identified the ad, and the date and time.

The user's browser displays any such ads identified for the user, or device page display manager 554 may display the ad(s) identified for the user on the user's device as described above.

Server page display manager 554 stores a record of the book and the page viewed by the user in server user information storage 518 associated with the user identifier corresponding to the viewing user. In one embodiment, if the mobile application is used to view the page, device page display manager 554 records the book and page viewed and forwards such information to server page display manager 554, with the viewing user's user identifier, and server page display manager 554 records such information in server user information storage 518 as described above. In one embodiment, the user identifier used to identify the user viewing the displayed page as well as any ads identified for the user may be a registered user identifier or an unregistered user identifier as described above.

When the user's browser or mobile application has displayed the page and any ads identified for the user, the user may make any number of actions, such as clicking on any ads displayed, or clicking any of the navigation buttons provided. If the user clicks on any displayed ad or ads, server page display manager 554 receives such clicks (via device page display manager 664 if the user is using the mobile application), and server page display manager 554 records such clicks in server user information storage 518 associated with the user's user identifier, which may be a registered user identifier or unregistered user identifier as described above. In one embodiment, a click on a displayed ad may be recorded with the ad identifier corresponding to the ad clicked and the current date and time.

Server page display manager 554 may also receive (via device page display manager 664 if the user is using the mobile application) any navigation command clicked by the user. When server page display manager 554 receives a navigation command from the user, it selects the next or previous page to display based on the navigation command received and animates a flip to the next or previous page based on the command received, as described above. In one embodiment, if the user is using the mobile application, device page display manager 654 checks for page data corresponding to the selected next or previous page in device book storage 614. If the selected next or previous page is not available in device book storage 614, device page display manager 654 requests and receives page data corresponding to the selected page from server page display manager 554, stores the received page data in device book storage 614 associated with the book identifier and page identifier, and renders and/or displays the selected page on the user's user device 410. Device page display manager 654 may also request from server page display manager 554, receive from server page display manager 554, and store in device book storage 614 page data corresponding to the next page after the currently displayed page of the selected book. In one embodiment, server page display manager 554 may send page data corresponding to the last page of a book with an indication of such, and device page display manager 654 may receive such indication with the page data and will not request a subsequent page if such last page is stored the device as described above.

If server page display manager 554 determines that the selected next page is not past the last page of the selected book, such as if the page order or number corresponding to the selected next page is not greater than the total number of pages of the selected book, then server page display manager 554 renders the selected next page as described above.

If server page display manager 554 determines that the selected next page is the last page of the selected book as described above, then server page display manager 554 signals server last page display manager 556, which receives the signal and displays biographical information corresponding to the author of the selected book, as well as any links to other books created by the same author and any forums corresponding to the book, as described above.

If the user is using the mobile application, server last page display manager 556 may send page data including instructions to display author biographical information and any links to other book(s) or forum(s), as described above, to device last page display manager 656, which receives and displays such last page data as described above.

Server last page display manager 556 signals server ad manager 550 (or device last page display manager 556 signals device ad manager 650, which signals server ad manager 550) to identify ads for the user viewing the book as described above. Server ad manager 560 receives the signal, identifies the ads for the ads as described above, and provides the ad identifier(s) corresponding to the identified ads to server last page display manager 556 (or to device ad manager 650, which provides the ad identifier(s) to device last page display manager 656). Server last page display manager 556 receives such ad identifiers, retrieves the HTML or other rendering instructions corresponding to such ad identifier(s) from server advertisement storage 568 and provides such HTML or other rendering instructions to the user's browser, if the user is viewing the last page via the user's browser, or to device last page display manager 656, if the user is viewing the last page via the mobile application. The user's browser or mobile application displays the received ad(s) as described above.

Once server last page display manager 556 or device last page display manager 656 has displayed the author biographical information, links to other book(s) and forum(s), and ads identified for the user as described above, the user may make any number of actions, such as clicking on any ads displayed, or clicking any of the displayed links to other books or to the forum, or commenting via the forum, or any other actions. If the user makes any user actions, server last page display manager 556 records such user actions in server user information storage 518 associated with the user's user identifier, which may be a registered user identifier or unregistered user identifier as described above and the date and time. In one embodiment, if the user is using the mobile application, device last page display manager 656 receives the actions from the user and provides the actions to server last page display manager 556. Forums may be operated conventionally via server last page manager 556, optionally via device last page manager 656.

At any time, server relationship manager 570 may receive categories, synonyms, and/or related words tables as described above, such as from a system administrator, and server relationship manager 570 stores any such information in server database storage 572.

Also at any time, server advertiser manager 574 may receive any number of advertisements from any number of ad providers. In one embodiment, server advertiser manager 574 receives an ad as instructions or commands for displaying the ad, such as the HTML to render the ad and/or any other ad data. Server advertiser manager 574 also receives each ad with one or more corresponding category word or words as described above, and server advertiser manager 574 stores each ad in server advertisement storage 568 associated with the corresponding category word(s) and a unique ad identifier.

In one embodiment, when server ad manager 550 receives a user identifier and signal to identify ads using the received user identifier as described above, server segregation manager 576 receives the user identifier and signal. Server segregation manager 574 identifies recent actions made by the selected user and segregates a group of similar users for the selected user as described above. In one embodiment, server segregation manager 574 identifies any number of recent actions corresponding to the received user identifier in server user information storage 518, including the book and page identifiers corresponding to any books and/or pages recently created or viewed by the selected user as described above. To identify the segregated group of other users similar to the selected user as described above, server segregation manager 574 may identify other user identifiers (registered and/or unregistered user identifiers) in server user information storage 518 for which recent actions similar to the selected user's recent actions are recorded as described above.

When server segregation manager 576 has segregated the group of similar other users for the selected as described above, it provides the user identifier corresponding to the selected user and other user identifier(s) corresponding to any similar other users identified to server score calculation manager 578. To provide the selected user identifier and other user identifiers, server segregation manager 576 may build a similar users table including the user identifier of the selected user and one or more other user identifiers corresponding to each other user identified as a similar other user for the selected user. In one embodiment, server segregation manager 576 stores the similar users table in server advertisement storage 568 associated with a unique ad identification serial number, and sends the ad identification serial number to server score calculation manager 578.

Server score calculation manager 578 receives the ad identification serial number from server segregation manager 576, and server score calculation manager 578 calculates one or more similarity scores, as described above with respect to step 314 of FIG. 3, for each of the other users identified as similar to the selected user. To calculate the similarity scores as described above, server score calculation manager 578 identifies the similar users table associated with the received ad identification serial number in server advertisement storage 568 and retrieves from server user information storage 518 any recent actions corresponding to the selected user identifier included in the similar users table, including the type of each action as well as any tag words, photo categories, page text, etc., corresponding to such actions as described above, as well as the recent actions corresponding to each other user identifier included in the similar users table. Server score calculation manager 578 compares the recent actions identified for the selected user with the recent actions identified for each of the other users included in the similar users table to calculate the similarity scores as described above. Server score calculation manager 578 stores each similarity score calculated for each other user included in the similar users table in server advertisement storage 568 associated with the other user identifier for which the score was calculated and the type of the similarity score, and sends the ad identification serial number corresponding to the similar users table to server combined score manager 580.

Server combined score manager 580 receives the ad identification serial number, and server combined score manager 580 assigns weights to each type of similarity score included in the similar users table corresponding to the received ad identification serial number in server advertisement storage 568 as described above. In one embodiment, server combined score manager 580 uses regression analysis to maximize the likelihood of clicks on ads to assign the weights and stores the assigned weights in the similar users table in server advertisement storage 568. Server combined score manager 580 multiplies each similarity score calculated for each other user in the similar users table with its assigned weight and sums the weighted scores for each other user to identify a final similarity score for each other user with respect to the selected user as describe above. When server combined score manager 580 has calculated a final similarity score for each other user identifier included in the similar users table, it stores the final similarity score for each other user in the similar users table and sends the ad identification serial number corresponding to the similar users table to server similar user ad manager 582.

Server user ad manager 582 receives the ad serial number and identifies ads likely to be clicked on by the selected user corresponding to the ad serial number, including the ads with the highest clickthrough rates by other users similar to the user as described above. To identify ads likely to be clicked by the selected user, server similar user ad manager 582 retrieves from server user information storage 518 any clicks information, including the ad identifier corresponding to any ad which received a click by a user, recorded corresponding to each other user identifier included in the similar users table corresponding to the received ad serial number. In one embodiment, server similar user ad manager 582 identifies any number of ads receiving one or more clicks from a similar other user included in the similar users table, initializes an ad bucket for each such ad (e.g. to zero), and accumulates scores in each ad bucket such that, for each ad, the total number of clicks that the ad received from similar other users included in the similar users table is recorded, and the final similarity score of the similar other user or users that clicked the ad is added to the ad bucket corresponding to that ad. In one embodiment, ad(s) receiving the most total clicks and/or ad(s) with the highest scoring ad bucket(s) may be identified as ads likely to be clicked on by the selected user, as described above. When server similar user ad manager 582 has identified one or more ads likely to be clicked on by the selected user, server similar user ad manager 580 provides the ad identifier(s) corresponding to such identified ads to server page display manager 554 or server last page display manager 556, which receives the ad identifier(s) and displays the ad(s) likely to be clicked on as described above.

In one embodiment, server category ad manager 584 also identifies ads likely to be clicked on by the selected user using ad category words as described above. To identify ads for the user using ad category words as described above, server category ad manager 584 may identify any number of category words using recent actions associated with the selected user identifier in server user information storage 518 and any of the categories, synonyms, and related words tables in server database storage 572. Server category ad manager 584 compares such category words with the category words associated with ads in server advertisement storage 568, and identifies ads for the user as the ads associated with similar or matching category words as the selected user's recent actions, as described above.

When server category ad manager 584 has identified one or more ads for the selected user, server category ad manager 584 provides the ad identifier corresponding to such identified one or more ads to server page display manager 554 or server last page display manager 556, which receives the ad identifier(s) and displays the ads as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The example code provided in the following appendices, when executed, enables performance of various operations in accordance with embodiments described above.

What is claimed is:

1. An apparatus comprising a processor and a non-transitory memory having computer code stored therein, the computer code configured, when executed by the processor, to cause the apparatus to:
   receive, by a server ad manager, a plurality of advertisements, wherein each of the plurality of advertisements comprises a first set of category words;
   receive, by a server log in/registration manager, registration information corresponding to a user, wherein the registration information comprises a user identifier, a password, user biographical information, and social network information, wherein the social network information comprises a social network identifier, a social network user identifier, and a social network password;
   access, by a server page specification manager from a server user information storage, recorded information for the user identifier, wherein the recorded information corresponds to one or more book identifiers regarding one or more books created by the user, wherein each of the one or more books comprises a set of images having corresponding text and attributes, and wherein the recorded information comprises book tags for the one or more books created by the user, wherein the each of the book tags comprises (i) one or more words or phrases that correspond to a title, photos, text, attributes, interests, emotions, moods, or a combination thereof that correspond to the book identifier, (ii) text words entered in at least one of the one or more books, (iii) words associated with user-selected photos included in any of the one or more books created by the user, and (iv) records of advertisements clicked by the user during viewing of one of the one or more books created by the user;
   receive, by the server page specification manager from a device new page manager, a command to add a new page to a particular book of the one or more books, wherein the particular book corresponds to a book identifier;
   in response to receipt, by the server page specification manager, of the command to add the new page to the particular book of the one or more books,
      display, by the server page specification manager, user interface controls comprising (v) text controls to change a size, a font, a style, a justification, a color, and an opacity of text to be displayed on the new page, and (vi) background controls to control a color and an opacity of a text box background corresponding to the text;
   receive, by the server page specification manager from a first user device, text to be displayed on the new page;
   generate, by the server page specification manager, a set of terms associated with the text based on a semantic analysis of the text, wherein at least one term in the set of terms is not included in the text; and
   identify, by the server page specification manager, an image to be displayed on the new page based on the text, the set of terms associated with the text, and the social network information.

2. The apparatus of claim 1, wherein the recorded information comprises level of interest information.

3. The apparatus of claim 2, wherein the level of interest information comprises page view information.

4. The apparatus of claim 2, wherein the level of interest information comprises page creation information.

5. The apparatus of claim 2, wherein the level of interest information comprises book category information.

6. The apparatus of claim 2, wherein the level of interest information comprises book category action information.

7. The apparatus of claim 1, wherein the computer code, when executed by the processor, is further configured to:
   identify, by the server page specification manager, actions associated with the user; and
   update, by the server page specification manager, the recorded information for the user to include the actions.

8. The apparatus of claim 1, wherein the user-selected photos are drawn from a social media application.

9. An apparatus comprising a processor and a non-transitory memory having computer code stored therein, the computer code configured, when executed by the processor, to cause the apparatus to:
   receive, by a server ad manager, a plurality of advertisements, wherein each of the plurality of advertisements comprises a first set of category words;
   receive, by a server log in/registration manager, registration information corresponding to a user, wherein the registration information comprises a user identifier, a password, user biographical information, and social network information, wherein the social network information comprises a social network identifier, a social network user identifier, and a social network password;
   access, by a server page specification manager from a server user information storage, recorded information for the user identifier, wherein the recorded information corresponds to one or more book identifiers regarding one or more books created by the user, wherein each of the one or more books comprises a set of images having corresponding text and attributes, and wherein the recorded information comprises book tags for the one or more books created by the user, wherein the each of the book tags comprises (i) one or more words or phrases that correspond to a title, photos, text, attributes, interests, emotions, moods, or a combination thereof that correspond to the book identifier, (ii) text words entered in at least one of the one or more books, (iii) words associated with user-selected photos included in any of the one or more books created by the user, and (iv) records of advertisements clicked by the user during viewing of one of the one or more books created by the user;
   receive, by the server page specification manager from a device new page manager, a command to add a new page to a particular book of the one or more books, wherein the particular book corresponds to a book identifier;
   in response to receipt, by the server page specification manager, of the command to add the new page to the particular book of the one or more books,
      display, by the server page specification manager, user interface controls comprising (v) text controls to change a size, a font, a style, a justification, a color, and an opacity of text to be displayed on the new page, and (vi) background controls to control a color and an opacity of a text box background corresponding to the text;
   receive, by the server page specification manager from a first user device, text to be displayed on the new page;
   generate, by the server page specification manager, a set of terms associated with the text based on a semantic analysis of the text, wherein at least one term in the set of terms is not included in the text; and
   identify, by the server page specification manager, an image to be displayed on the new page based on the text, the set of terms associated with the text, and the social network information.

10. The apparatus of claim 9, wherein the words associated with the user-selected photos comprise titles or tags associated with the user-selected photos.

11. The apparatus of claim 9, wherein the user-selected photos are drawn from a social media application.

12. The apparatus of claim 9, wherein the user-selected photos are drawn from a social media application.

13. A system for advertisement selection, the system comprising:
   a user device comprising:
      a user interface;
      a communications interface configured to facilitate communications with a server system; and
      a first processor configured to generate and transmit to the server system, via the communications interface, recorded information for a user identifier, wherein the recorded information corresponds to one or more book identifiers regarding one or more books created by a user, wherein each of the one or more books comprises a set of images having corresponding text and attributes, and wherein the recorded information comprises book tags for the one or more books created by the user, wherein the each of the book tags comprises (i) one or more words or phrases that correspond to a title, photos, text, attributes, interests, emotions, moods, or a combination thereof that correspond to the book identifier, (ii) text words entered in at least one of the one or more books, (iii) words associated with user-selected photos included in any of the one or more books created by the user, and (iv) records of advertisements clicked by the user during viewing of one of the one or more books created by the user;
   the server system comprising a second processor configured to:
      receive, by a server ad manager, a plurality of advertisements, wherein each of the plurality of advertisements comprises a first set of category words;
      receive, by a server log in/registration manager, registration information corresponding to a user, wherein the registration information comprises the user identifier, a password, user biographical information, and social network information, wherein the social network information comprises a social network identifier, a social network user identifier, and a social network password;
      access, by a server page specification manager from a server user information storage, the recorded information for the user identifier;
      receive, by the server page specification manager from a device new page manager, a command to add a new page to a particular book of the one or more books, wherein the particular book corresponds to a book identifier;
      in response to receipt, by the server page specification manager, of the command to add the new page to the particular book of the one or more books,
         display, by the server page specification manager, user interface controls comprising (v) text controls to change a size, a font, a style, a justification, a color, and an opacity of text to be displayed on the new page, and (vi) background controls to control a color and an opacity of a text box background corresponding to the text;

receive, by the server page specification manager from a first user device, text to be displayed on the new page;

generate, by the server page specification manager, a set of terms associated with the text based on a semantic analysis of the text, wherein at least one term in the set of terms is not included in the text; and identify, by the server page specification manager, an image to be displayed on the new page based on the text, the set of terms associated with the text, and the social network information.

14. The system of claim 13, wherein the recorded information comprises level of interest information.

15. The system of claim 14, wherein the level of interest information comprises page view information.

16. The system of claim 14, wherein the level of interest information comprises page creation information.

17. The system of claim 14, wherein the level of interest information comprises book category information.

18. The system of claim 14, wherein the level of interest information comprises book category action information.

19. The system of claim 13, wherein the words associated with the user-selected photos comprise titles or tags associated with the user-selected photos.

20. The system of claim 13, wherein the user-selected photos are drawn from a social media application.

* * * * *